United States Patent [19]

Hawkins et al.

[11] 4,365,189

[45] Dec. 21, 1982

[54] CONTROL CIRCUIT FOR REVERSIBLE ELECTRIC MOTORS

[75] Inventors: Raymond C. Hawkins, Minneapolis; Howard N. Seim, Columbia Heights; Donald J. Haub, Champlin, all of Minn.

[73] Assignee: Tennant Company, Minneapolis, Minn.

[21] Appl. No.: 68,161

[22] Filed: Aug. 20, 1979

[51] Int. Cl.³ .............................................. B60K 1/02
[52] U.S. Cl. .................................. 318/284; 180/65 R; 318/139
[58] Field of Search ............... 318/284, 139, 263, 273, 318/283; 180/65 R, 65 F, 272, 271

[56] References Cited

U.S. PATENT DOCUMENTS

| | | | |
|---|---|---|---|
| 2,378,785 | 6/1945 | Ogden | 318/284 |
| 2,394,111 | 2/1946 | Schaelchun et al. | 318/263 |
| 2,494,611 | 1/1950 | Eisenberg et al. | 318/284 |
| 2,510,028 | 5/1950 | Ulinski | 318/263 |
| 2,817,802 | 12/1957 | Roggenkamp | 318/284 |
| 2,990,506 | 6/1961 | Montross | 318/284 |
| 3,179,198 | 4/1965 | Hastings | 180/65 R |
| 3,332,507 | 7/1967 | Bush | 318/284 |
| 3,436,632 | 4/1969 | Tisserant et al. | 318/284 |
| 3,884,318 | 5/1975 | Abels et al. | 180/65 R |
| 3,923,116 | 12/1975 | Thompson et al. | 180/65 R |

Primary Examiner—David M. Mitchell
Attorney, Agent, or Firm—Merchant, Gould, Smith, Edell, Welter & Schmidt

[57] ABSTRACT

A reversible electrically driven motor is disclosed together with circuitry for controlling the direction of the motor such that the current to the drive motor cannot be reversed to an opposite direction while the motor continues operation in a first direction. Once the motor slows to predetermined speed, which may approximate near-stop condition, the circuitry permits the voltage to operate in the opposite direction thereby reversing the motor. The control apparatus may include the portion of the electric motor which operates as a generator when the motor is not being electrically driven, a solid state sensor for sensing the voltage generated, and a lock-out circuit which responds to the sensed voltage to disable the operation of the driving circuit which reverses the motor.

6 Claims, 4 Drawing Figures

CONTROL CIRCUIT FOR REVERSIBLE ELECTRIC MOTORS

CROSS REFERENCE

Related subject matter can be found in U.S. patent application Ser. No. 068,160, filed Aug. 20, 1979 and owned by the assignee in this present application.

TECHNICAL FIELD

The present invention relates to certain improvements in control circuitry on electric motors.

A wide variety of electric motors employ some means for reversing direction. These electric motors may be used in vehicles such as golf carts, automobiles and floor maintenance equipment and non-vehicles including conveyors. The control circuit may be utilized on any such equipment to protect the electric drive motor from damage and improve the safety of operation. When used on an electric vehicle it is recognized that an operator may be endangered by the sudden jolting action caused when a large electric motor is suddenly reversed. There is also the possibility of damage to the motor or other parts by such action. When employed on such vehicles, the present invention eliminates this jolting problem.

BACKGROUND OF THE PRIOR ART

Historically, electric motors have not in themselves been provided with means for eliminating this jolting action caused by sudden reversal of the motors. However, some equipment employing a silicon controlled rectifier (SCR) control do not have such a jolting problem. The disadvantage of the SCR control system is that it usually increases the cost of the drive system substantially.

BRIEF SUMMARY OF THE PRESENT INVENTION

The present control apparatus is designed for use in conjunction with machinery employing reversible electric drive motors. The present invention will be described primarily with regard to an electrically powered floor scrubber, however, the motor and control circuit can be used in conjunction with various other types of machinery. When used on an electric vehicle, the invention functions when the operator of the vehicle attempts to change the direction of the vehicle from forward to reverse or reverse to forward while the vehicle is still rolling. The control circuit blocks or "locks-out" the flow of current which will reverse the motor's direction of rotation until such time as the vehicle has slowed at least to a predetermined speed, typically a near-stop, either by coasting friction or by braking. When the near-stop condition is reached, the control circuit then permits the reverse flow of current to the motor, which changes the motor's direction. The control circuit operates in a similar manner when switching from forward to reverse as from reverse to forward. When the vehicle is merely slowed and then restarted in the same direction, the control circuit does not interfere with the operation of the vehicle.

This lock-out function is accomplished by sensing whether the vehicle wheels are still rolling, and if so, the direction of rotation and whether the wheels are rolling at a speed greater than the predetermined speed. The control circuit utilizes one electric drive motor for the sensing function. When the vehicle is coating, i.e. rolling either forward or backward with no power applied to the motor, the motor's armature rotates because it is still engaged with the drive shaft and wheel. Due to the characteristics of the motor, residual magnetism remains in the field and its surrounding material. As the rotating armature cuts this magnetic field a small current is generated in the armature windings. In the second preferred embodiment, an electric motor having a separate stationary winding is employed. The extra winding is energized so as to provide a magnetic field of specific density in place of the field created by the above-mentioned residual magnetism. Current thereby generated is applied to the base of a transistor through a voltage divider network such that when sufficient current is generated, the transistor conducts from collector to emitter. When the transistor is conducting, lock-out relays are energized. The energized relays prevent the flow of current to the motor in an opposite direction (without inhibiting restarting the motors in the same rotational direction) should the operator throw the appropriate reversing switches.

When the vehicle coasts to a near stop, the current generated by the drive motors approaches zero. At that point, the transistor will no longer conduct and the lock-out relays will become de-energized, permitting the motor to be restarted in either direction. The reverse current will now be able to flow into the motor. The cycle is then repeated if the operator again attempts to reverse vehicle direction while still coasting.

DETAILED DESCRIPTION OF THE INVENTION

The present invention may be used in any machinery employing an electrically reversible motor. To better understand the invention, the embodiment of a floor maintenance vehicle, or scrubber is described in detail.

Figure 1:
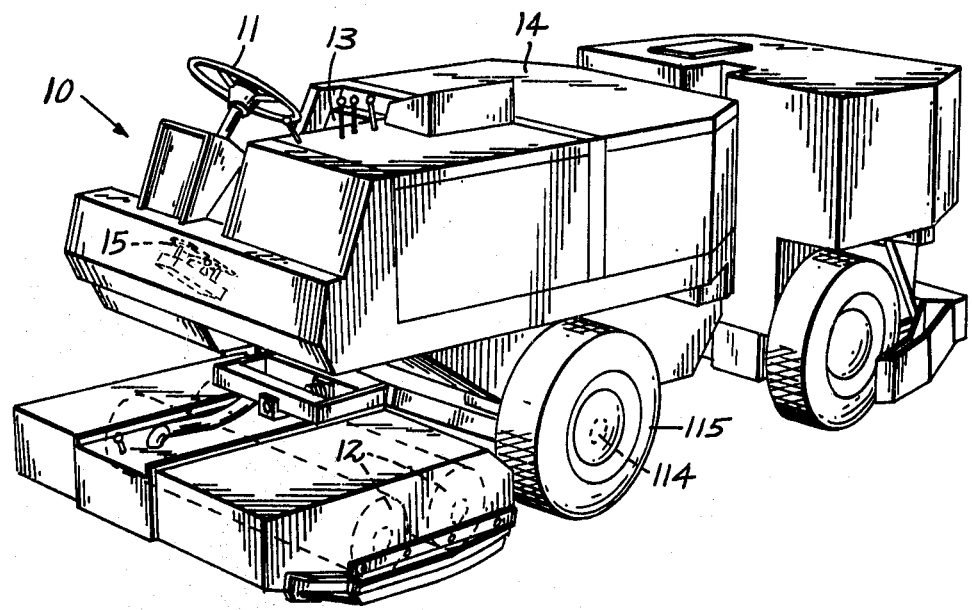
FIG. 1 is a perspective view of an electric vehicle.

A riding type floor scrubbing machine 10 is disclosed in FIG. 1 having one of its drive wheels 115 visible and drive shaft 114 visible. Scrubbing brushes 12 are attached to the front section of the vehicle. Compartment 14 is the location of the storage batteries. Seat 13 is the operator's seat. Foot control 15 is the forward/reverse and speed range control and wheel 11 is the steering wheel for the vehicle.

Figure 2:
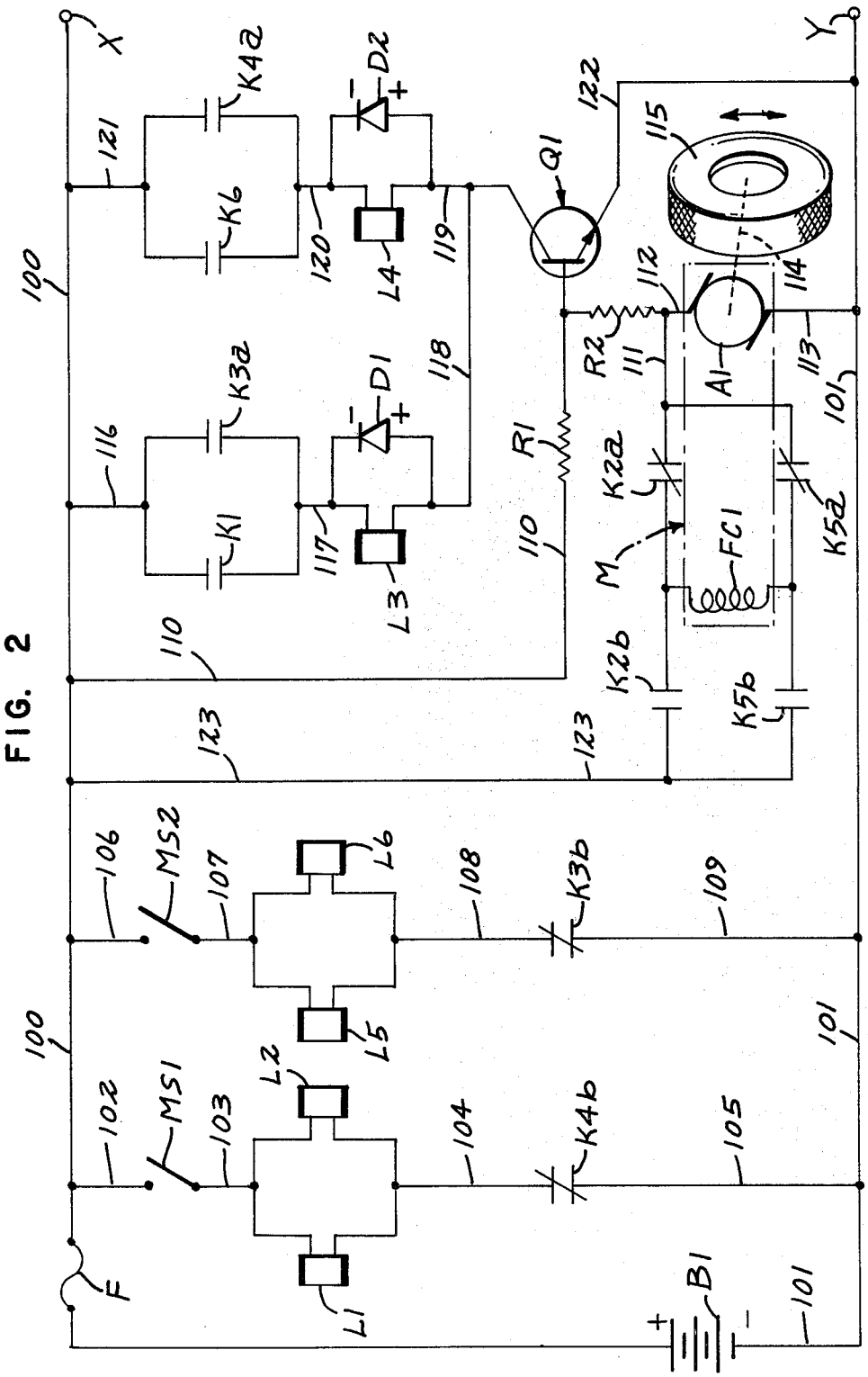
FIG. 2 is a schematic circuit of one preferred embodiment of the direction control circuit.

The first preferred embodiment of the present control circuit is illustrated in FIG. 2 and includes a motor M with an armature A1 and a field coil FC1. In this example, the motor is of a type such that residual magnetism in the field will induce a voltage from approximately 10 mv to 10 v in the armature when rotated. Selection of a suitable motor may be accomplished by simply testing standard production motors to determine which of them are inherently capable of producing the required voltage output. The motor M is powered by the battery or combination of batteries B1 which may be of any suitable voltage such as 36 or 72 volts. The switch MS1 controls the forward rotation of motor M and the switch MS2 controls the reverse rotation of motor M.

The circuit contains a plurality of relays having relay coils designated generally with the letter "L" and relay contacts generally designated by the letter "K". Relay coils L1 through L6 should be chosen such that they are operational with the voltage selected for the battery B1. The general function of each of the above relays is as follows: relay coil L1 and its contact K1 (normally-open type) function to operate relay coil L3 and its contacts K3a (normally-open type) and K3b (normally-closed type), which in turn prevent the operation of the motor reversing circuit when the vehicle is still rolling in a forward direction, thus "locking out" the reverse mode. Relays L2 and L5 are used to direct current through the field coil FC1 so that the armature A1 will roate in the direction desired, i.e. forward or reverse. Relay coil L2 and its contacts K2a (normally-closed type) and K2b (normally-open type) function to permit the flow of current through the motor M, causing it to drive the vehicle in a forward direction. Relay coil L5 and its contacts K5a (normally-closed type) and K5b (normally-open type) function to provide the motor M with current so it will move the vehicle in a reverse direction. Relay coil L6 and its contact K6 (normally-open type) and relay coil L4 and its contacts K4a (normally-open type) and K4b (normally-open type) function to prevent the operation of motor M in a forward direction while the vehicle is rolling in a reverse direction, thus "locking out" the forward mode.

Transistor Q1 is an NPN transistor used for switching. It should be selected such that it is capable of carrying a current from collector to emitter at least as large as the current drawn by relay coil L3 or L4. Transistor Q1 is used to sense the current generated by motor M when the vehicle is coasting and thereby controls relay coils L3 and L4. Voltage is generated by the motor M even through the field coils have no voltage applied, because residual magnetism in the field coil FC1 and surrouding material is sufficient to induce a voltage in the armature A1. Relay coils L3 and L4, as mentioned earlier, provide this lock-out function.

Diodes D1 and D2 located across relay coils L3 and L4 respectiely function as clamping diodes, preventing damaging voltage spikes on the transistor Q1 which may occur when the magnetic field of relay coils L3 or L4 collapse. Fuse F provides protection against overload and direct shorts.

Resistors R1 and R2 provide bias for transistor Q1. Their selection depends upon the battery voltage B1 and at what point the switching function of Q1 is desired. The choice of values can be determined by a person skilled in the art. Though other values may produce an operating device, the choice of R1=20,000 ohms, R2=250 ohms, transistor Q1=No. 2N 3055 and battery voltage B1 equals 36 volts and diodes D1 and D2 being type 3AF2 are considered satisfactory for this example being described.

Circuit Layout

The circuit in FIG. 2 incldes a battery B1 whose positive terminal is connected to fuse F and in turn to bus line 100 and whose negative terminal is connected to bus line 101. Included on bus line 100 is a terminal point X and on bus line 101 a terminal point Y which are used to designate electrical connection of additional circuitry in the second preferred embodiment. Bus line 100 is tapped by conductor 102 which is connected to one terminal of switch MS1. The other terminal of switch MS1 is connected to the parallel combination of relay coils L1 and L2 by conductor 103. The other ends of the parallel combination L1 and L2 are connected to normally-closed relay contact K4b by conductor 104. The other side of relay contact K4b is connected through conductor 105 to the negative bus line 101. The positive bus line 100 is also tapped by conductor 106, which is connected to switch MS2. The other side of MS2 is connected to the parallel combination of relay coils L5 and L6 by conductor 107. The other ends of L5 and L6 are connected to normally closed relay contact K3b by conductor 108. The other side of contact K3b is connected through conductor 109 to the negative bus line 101.

The positive bus line 100 is again tapped by conductor 110, which is connected to resistor R1. The other side of resistor R1 is connected to the base of NPN transistor Q1 and resistor R2. The other side of resistor R2 is connected to conductors 111 and 112. Conductor 112 is connected to the armature winding of A1 of an electric motor. The other side of armature A1 is connected through conductor 113 to the negative bus line 101. The armature A1 is also mechanically connected to drive shaft 114. Drive shaft 114 is mechanically connected to wheel 115.

Positive bus line 100 is tapped by conductor 116, which is connected to the parallel combination of relay contacts K1 and K3a. The other side of parallel combination K1 and K3a is connected to conductor 117. Conductor 117 is then connected to the parallel combination of relay coil L3 and the cathode side of diode D1. The other ends of coil L3 and the anode end of D1 are connected to conductor 118. Conductor 118 is attached to the parallel combination of relay coil L4 and the anode side of diode D2 through conductor 119. The other side of the parallel combination L4 and cathode of D2 is connected in parallel to conductor 120. Conductor 120 is connected to the parallel combination of normally open contacts K6 and K4a. The other side of the combination K6 and K4a is connected to conductor 121, which is connected to the positive bus line 100.

The emitter of the transistor Q1 is connected to negative bus line 101 by conductor 122. The collector of transistor Q1 is connected to conductor 118. Conductor 111 is connected to the parallel combination of normally-closed relay contacts K2a and K5a. The other side of relay contact K2a is connected to normally-open relay contact K2b and one end of the field coil FC1 of the electric motor. The other side of relay contact K5a is connected to the other end of field coil FC1 and normally-open relay contact K5b. The other side of relay contacts K2b and K5b are connected to conductor 123. Conductor 123 is in turn connected to positive bus line 100.

Operation of the Invention

The improved control circuitry may be used in conjunction with a variety of floor maintenance equipment including walk-behind or riding-type floor scrubbers. A typical riding type vehicle is 10 as shown in FIG. 1. Foot control 15 in this embodiment may include a speed and direction control which, when moved forward, will operate switch MS1. When the control is moved backward from its center position, it will close switch MS2.

Thus, when the foot control is moved forward, the vehicle will move in a forward direction and, similarly, moving the control backward will move the vehicle in a reverse direction.

Commencing from a relaxed, non-moving state, forward motion of the vehicle is started by closing switch MS1 which completes the circuit from battery B1 through fuse F, through bus line 100 and conductors 102 and 103, energizing relay coils L1 and L2, and continuing through the conductor 104 and across normally-closed relay contacts K4b to conductor 105 and back through the negative bus 101 to battery B1. When relay coil L1 is energized, its normally-open relay contact K1 closes. When relay coil L2 is energized, its normally-closed relay contact K2a opens and its normally-open relay contact K2b closes. This permits a flow of current from battery B1 through fuse F, through bus line 100 into conductor 123 across normally-open relay contact K2b, which is now closed, into field coil FC1 across still closed relay contact K5a into conductor 111, then through resistor R2 to the base of transistor Q1, and also into conductor 112 through the armature coil A1 and from there into conductor 113 and back to battery B1 through bus line 101. Now that field coil FC1 and armature coil A1 are energized, the electric motor will rotate turning drive shaft 114 and drive wheel 115. Simultaneously, current enters conductor 110 from bus line 100 going through resistor R1 to the base of transistor Q1. Current entering the base of Q1 through resistor R1 and resistor R2 are sufficient to cause transistor Q1 to conduct from collector to emitter. Additionally, current from bus line 100 enters conductor 116 and goes through relay contact K1 which is closed, now that relay coil L1 is energized, and travels into conductor 117 to relay coil L3. From there, current travels into conductor 118 to the collector of transistor Q1. The current entering the collector of transistor Q1 leaves the emitter and through conductor 122 returns to battery B1 on bus line 101. With relay coil L3 now energized, relay contact K3a will close creating a holding arrangement permitting the flow of current from conductor 116 to 117 regardless of the state of relay contact K1. This means that when switch MS1 is opened, i.e. the vehicle is coasting forward, the circuit from conductor 116 to 117 remains complete. Likewise, the energizing of relay coil L3 opens the normally-closed relay contact K3b. The opening of K3b will prevent the completion of the circuit containing switch MS2 and thus prevent operation of the motor in a reverse direction at this time.

The operator may attempt to reverse the direction of the vehicle while the vehicle is still rolling forward. The operator would open switch MS1 and close the reversing switch, MS2. One of the novel features of the invention comes into play at this point. In order to prevent the jolting action or associated damage to the motors caused by a sudden reversal of motor direction, the invention prevents the motor from being energized in the reverse direction until such time as the vehicle has been slowed down to a near-stop by "locking-out" the reversing circuitry. Even though MS1 is now open, the circuit containing relay coil L3 remains completed so long as transistor Q1 continues to conduct from collector to emitter. This assures the lock-out function of relay contact K3b by blocking the operation or the reverse circuit containing MS2. Relay contact K3b remains open so long as transistor Q1 is conducting. Adjustment of the transistor biasing resistors R1 and R2 permits adjustment of the "near-stop" speed.

While the vehicle is coasting in a forward direction, armature A1 rotates even though it is not energized because of its mechanical connection to the wheel 115 through drive shaft 114. Due to residual magnetism in the field, a small voltage is generated in the armature A1 of the electric motor. As the speed of the vehicle diminishes, the amount of current passing into the base of transistor Q1 also diminishes. Instead, current will now have increasing tendency to travel through R2 into the armature A1 which now acts as a current sink draining current which might otherwise have gone into the base of transistor Q1. As the vehicle approaches a near-stop, the voltage generated by the armature coil will be nearly zero and at some point there will not be sufficient current entering the base of transistor Q1 to continue conduction from collector to emitter. The point of non-conduction is adjusted by changing the characteristics or biasing of transistor Q1 with resistors R1 and R2. When transistor Q1 ceases to conduct, relay coil L3 will no longer be energized. This will then allow the normally-closed relay contact K3b to close again.

With relay contact K3b now closed again, current may now flow from battery B1 through fuse F, through bus line 100 and conductor 106, then through switch MS2 into conductor 107 to the parallel combination of relay coil L5 and L6, closing contacts K5b and K6 and opening K5a and flowing into conductor 108 through the closed relay contack K3b into conductor 109, and back to battery B1 through bus line 101.

Now current will also be able to flow from bus line 100 into conductor 123 through normally-open relay contact K5b into field coil FC1 and then through relay contact K2a, which is now closed, to conductor 111 and through resistor R2 into the base of collector Q1 and into conductor 112, and from there through armature A1 and returning to the battery by conductors 113 and bus line 101.

Simultaneously, current flows from the positive bus line 100 into conductor 121 and into the parallel combination of relay contacts K6 and K4a, and from there into conductor 120 which is connected to the relay coil L4. Current travels through L4 to conductor 119 and into the collector of transistor Q1. Since Q1 is conducting, current will travel from the collector into the emitter of Q1 and into conductor 122 returning to the battery through the negative bus line 101. Because relay coil L4 is now energized, contact K4a now closes in a holding combination permitting current to flow through the above-described branch circuit involving relay coil L4, regardless of whether relay contact K6 is open or closed.

When the operator wants to discontinue his travel in the reverse direction and drive forward again, he will open the reverse switch MS2, and close the forward switch MS1. Again this invention will avoid the problem of jolting the vehicle with such an abrupt change of direction by employing the same technique as used in the above-described forward-to-reverse condition. The control circuit will "lock-out", i.e. prevent, current from passing through the forward switch MS1 so long as the vehicle is coasting in a reverse direction. This is accomplished in substantially the same manner as was used to prevent jolting when changing from forward-to-reverse directions. This time, however, the forward circuit is interrupted by relay contact K4b which is open so long as relay coil L4 is energized. Relay coil L4 remains energized as long as Q1 is conducting, and Q1 conducts until such time as armature A1 is no longer being rotated by drive shaft 114 and wheel 115 at a sufficient speed to bias the base of transistor Q1 into a conducting state.

SECOND PREFERRED EMBODIMENT

Figure 3:
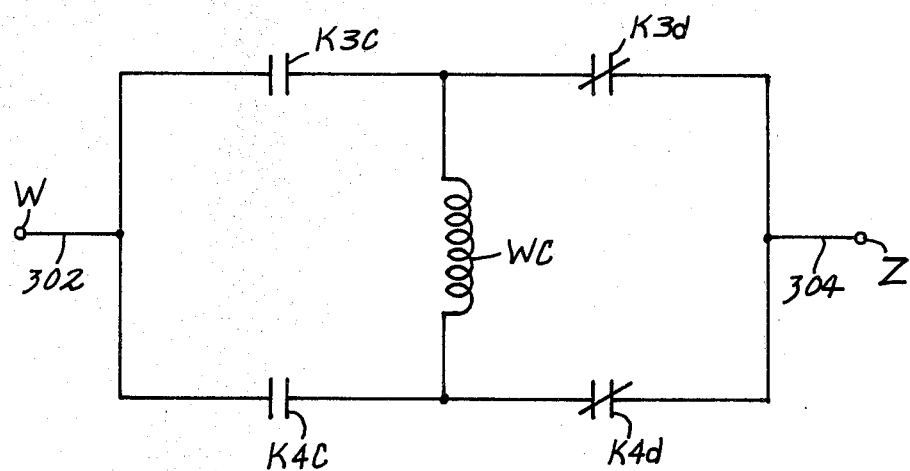
FIG. 3 is a schematic circuit of additional circuitry suitable for use in conjunction with the circuit of FIG. 2 to provide a second preferred embodiment of the invention utilizing a separate field coil in the motor for generating a detectable voltage.

A second preferred embodiment of this invention is made up of the identical circuitry of FIG. 2 with the addition of the circuitry shown in FIG. 3 where terminal point W in FIG. 3 is attached to terminal point X in FIG. 2 and where terminal point Z in FIG. 3 is attached to terminal point Y in FIG. 2. The second preferred embodiment therefore may include every element of the circuit in FIG. 2 plus the elements of the circuit in FIG. 3.

This second preferred embodiment contains a winding WC which consists of an extra stationary winding inside motor M which when energized with an electric current will create a magnetic field thereby inducing a current in the armature A1 when the vehicle is coasting, i.e. with no current applied to the armature A1. Winding WC provides a predictable magnetic field required to produce the generating effect in the armature of motor M when the vehicle is coasting, which compensates for the inability of some motor core materials to retain a sufficient residual magnetism to produce a suitable magnetic field. Thus, in this embodiment the residual magnetism of the field in motor M is not critical. The precise specifications of winding WC are not critical. It is only important that the voltage induced in the armature be sufficient to operate transistor Q1. A person skilled in the art could vary the bias of Q1, size and number of windings in WC and the amount of voltage applied to WC to achieve the desired output in the armature.

FIG. 3 also includes normally-open relay contact K3c and normally-closed relay contact K3d which are operated by the relay coil L3 in FIG. 2. Also found in FIG. 3 is normally-open relay coil contact K4c and normally-closed relay contact K4d which are operated by relay coil L4 found in FIG. 2.

The circuitry in FIG. 3 contains the parallel combination of normally-open relay contacts K3c and K4c which are connected at one end to conductor 302 and in turn to terminal point W. The other end of contact K3c is connected to one end of winding WC and the normally-closed relay contact K3d. The other end of relay contact K4c is connected to the other end of winding WC and normally-closed relay contact K4d. The other ends of K3d and K4d are connected in parallel to conductor 304 and in turn to terminal point Z.

The operation of the circuitry of this second preferred embodiment is as follows: the combination of circuitry in FIG. 2 and FIG. 3 operates identically to that of that explained in the first embodiment with the addition of a current which flows from bus line 100 to terminal point X and in turn into terminal point W into conductor 302 as shown in FIG. 3. Now when L3 is energized, contact K3c will be closed permitting current to flow through K3c into winding WC across the already closed relay contact K4d into conductor 304 to terminal W and into terminal Y on FIG. 2.

When relay coil L4 is energized, indicating motion in a reverse direction, current travels from terminal point X into terminal point W and there in turn into conductor 302 across the now closed relay contact K4c up through winding WC, through K3d which is already closed, into conductor 304, to terminal point Z and in turn into terminal point Y on FIG. 1. Thus, because of the reversal in current in winding WC, the current generated in armature A1 will have the same polarity regardless of whether the vehicle is rolling forward or backward.

Third Preferred Embodiment

Figure 4:
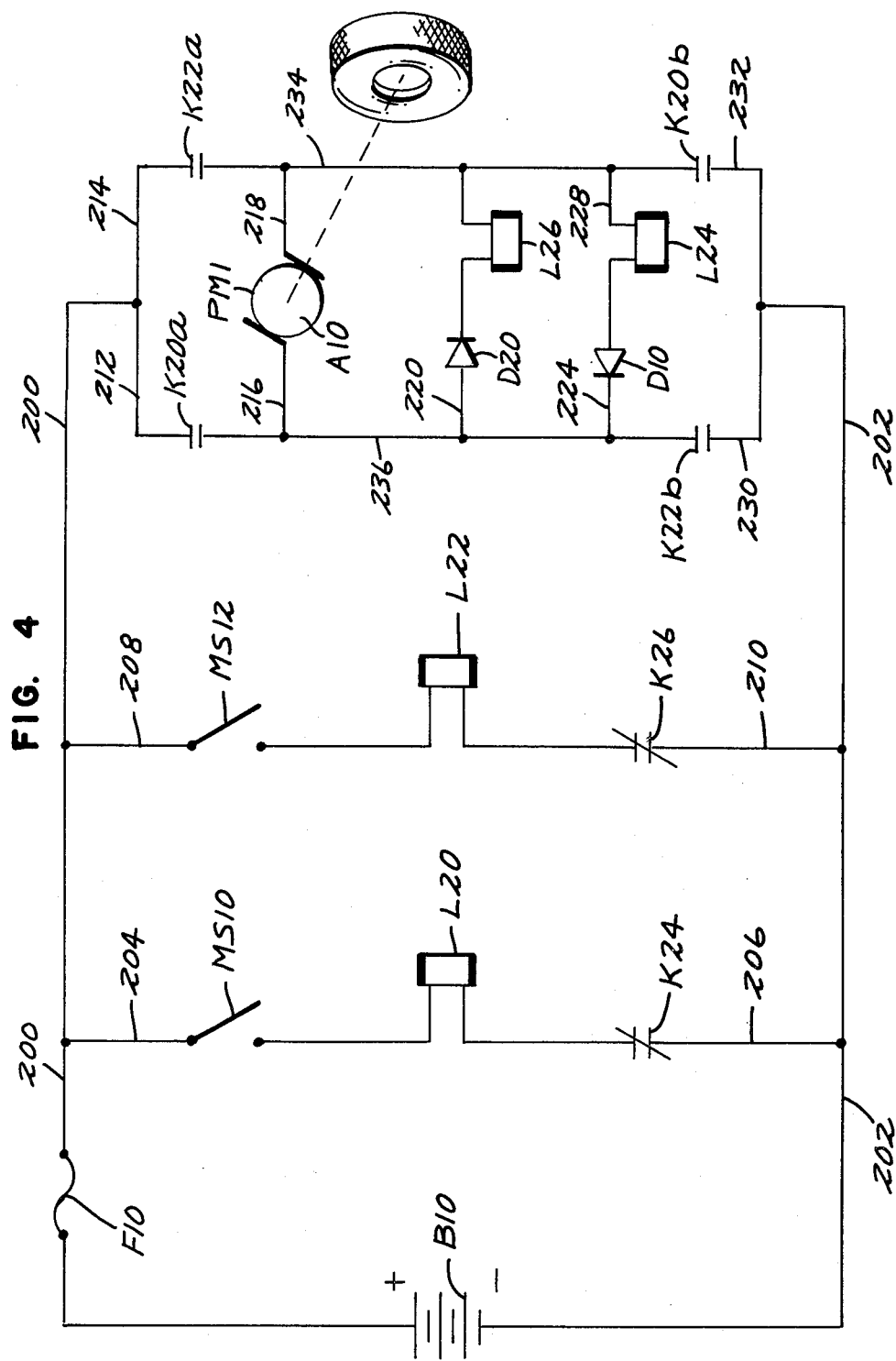
FIG. 4 is a schematic circuit of a third preferred embodiment illustrating an alternative lock-out circuit using a permanent-magnet motor.

The "lock-out" function of this invention may also be accomplished with the use of permanent magnet motors in place of motors with wire-wound field coils as described above. Because a permanent magnet motor will inherently generate a substantial electric voltage when its armature is rotated while the vehicle is coasting, it is unnecessary to provide transistor amplification of the current generated to operate relays which in turn perform the lockout function. FIG. 4 is a schematic drawing of circuitry of this third preferred embodiment.

In brief, the lock-out circuitry in FIG. 4 functions much the same as that in the embodiment aforedescribed. In this embodiment, however, the use of a permanent magnet motor generates so much voltage when the vehicle is coasting that this current is sufficient to energize relays which function to lock-out the operation of a reversing current, i.e. either forward or backward, depending on which way the vehicle is coasting.

Looking to FIG. 4, the vehicle's forward travel is initiated by closing manual switch MS10 which permits current to flow from the battery B10 through fuse F10 into bus line 200, into conductor 204, across to switch MS10 through relay coil L20 across normally-closed relay contact K24 into conductor 206 and back to battery B10 through bus line 202. With relay coil L20 energized, current now flows from bus line 200 into conductor 212 across normally-open relay contact K20a, which is now closed, into conductor 216 into permanent magnet motor PM1 into conductor 218 through conductor 234, across normally-open relay contact K20b, which is now closed, into conductor 232 and returning to the battery through bus line 202. Current will also flow into conductor 236, to conductor 220 across diode D20 through relay coil L26 into conductor 234 through relay contact K20b and back to the battery through bus line 202. Relay coil L24 cannot be energized at this time because diode D10 will not permit current of this polarity to flow in this direction. With relay coil L26 energized, normally-closed relay contact K26 now opens, preventing the operation of the motor in a reversed direction which would be initiated by closing switch MS12.

If MS10, the forward switch, is now opened and MS12 is closed, the reverse switch, the vehicle will continue to roll forward since the lock-out circuitry will prevent the operation of the circuit for reversing the vehicle. So long as relay coil L26 is energized, relay contact K26 remains open and closing switch MS12 is ineffectual. Although no current is flowing in the bus lines, armature A10 of permanent magnet motor PM1 is still turning, thereby generating a current flowing from conductor 216 into conductors 236 and 220 through diode D20 across relay coil L26 into conductor 234 and back to the motor via conductor 218, thereby keeping L26 energized until armature A10 comes to a near-stop. When a near-stop is reached, motor PM1 will no longer generate sufficient current to keep L26 energized and relay contact K26 will return to its normally-closed state. This will now permit the reverse switch MS12 to complete a circuit which will energize motor PM1 in the opposite direction and energize coil L24 which will in turn open the normally-closed contact K24. Current will flow from bus line 200 into conductor 208, across MS12, through relay coil L22 across relay contact K26, into conductor 210 and back to the battery via bus line 202. Relay coil L26 cannot be energized at this time because diode D20 will not permit current of this polarity to flow in this direction. With L22 energized, current will flow from bus line 200, into conductor 214 across relay contact K22a, which is now closed, through motor PM1 via conductor 218 and 216 (causing it to rotate in the reverse direction), and back to the battery B10 via conductor 236 across K22b and through bus line 202. Simultaneously relay coil L24 will be energized by current from conductor 234 entering conductor 228, going through L24 and D10 and conductor 224, contact K22b, conductor 230 and bus line 202. With K24 now open, the forward circuit including MS10 will be locked-out. Again, when the vehicle is coasting in a reverse direction, the current generated in motor PM1 will be sufficient to energize the appropriate relay coil, in this case L24, through diode D10. When the vehicle finally comes to a near stop, relay coil L24 will be deenergized and the forward circuit will then no longer be locked-out.

What is claimed is:

1. A circuit comprising, in combination, an electrically reversible DC motor having field and armature coils, means for reversing the flow of current through said field coil to reverse the direction of the motor, and a control circuit for sensing the rotation of said motor in a coasting state wherein said motor is rotating without voltage applied to said coils and for preventing the application of voltage to said field coil which would reverse the direction of said motor until said motor has slowed to a predetermined rotational velocity, said control circuit including detecting means connected in parallel with said armature coil for detecting voltage generated therein when said motor is in said coasting state, and preventing means responsive to said detecting means for preventing application of said reversing voltage to said motor while said detecting means is sensing said generated voltage.

2. A circuit comprising;
   an electrically reversible DC motor having field and armature coils in series, said armature coil having one side at ground potential;
   means for reversing the flow of current through said field coil for reversing the rotation of the motor;
   a control circuit for sensing rotation of said motor, said control circuit serving to prevent application of electrical power to said motor until it has slowed to a predetermined rotational velocity, said control circuit including a transistor having its base connected to the ungrounded side of said armature coil and its emitter grounded.

3. The circuit of claims 1 or 2 wherein said motor is capable of sustaining residual magnetism when no current is flowing in said field coil so that a voltage will be induced in said armature coil when rotated.

4. A circuit comprising, in combination, an electrically reversible motor having field and armature coils and capable of sustaining residual magnetism when no current is flowing in said field coil, means for reversing the flow of current through said field coil to reverse the direction of the motor, and a control circuit for sensing the rotation of said motor in a coasting state wherein said motor is rotating without voltage applied to said coils and for preventing the application of voltage to said field coil which would reverse the direction of said motor until said motor has slowed to a predetermined rotational velocity, said control circuit including detecting means connected in parallel with said armature coil for detecting voltage generated therein when said motor is in said coasting state, and preventing means responsive to said detecting means for preventing application of said reversing voltage to said motor while said detecting means is sensing said generated voltage.

5. In combination, an electrically reversible motor and control circuit for sensing the rotation of said motor while the armature of said motor is rotating without voltage applied and means for preventing the application of voltage to said motor until said armature has slowed to a predetermined rotational velocity, said motor being capable of generating an electric voltage when the motor is in said coasting state, said control circuit comprising:
   a first control circuit for applying voltage to said motor causing said armature to rotate in a first direction;
   a second control circuit for applying voltage to said motor causing said armature to rotate in a second direction being opposite to said first direction,
   means for detecting said generated voltage;
   said preventing means including:
   a first normally closed relay contact in series with said first circuit, and second normally closed relay contact in series with said second circuit;
   first holding circuit means controlling said first relay contact, a second holding circuit means controlling said second relay contact;
   said preventing means being responsive to said detecting means for preventing completion of said first circuit when said armature is rotating in said second direction and for preventing completion of said second circuit when said armature is rotating in said first direction;
   said first holding circuit means being responsive to said detecting means for holding said first relay contact in its open-circuit state until said armature has slowed to said predetermined speed when said armature is coasting in said first direction;
   said second holding circuit means being responsive to said detecting means for holding said second relay contact in its open-circuit state until said armature has slowed to said predetermined speed when said armature is coasting in said second direction;
   and wherein said second holding circuit means includes;
   a first relay coil for controlling said second relay contact;
   a third relay contact responsive to said first relay coil and being in series with said first relay coil;
   a fourth relay contact in parallel with said third relay contact;
   a second relay coil in series with said first control circuit for controlling said fourth relay contact;
   and wherein said first holding circuit means includes;
   a third relay coil for controlling said first relay contact;
   a fifth relay contact responsive to said third relay coil in series with said third relay coil;
   a sixth relay contact in parallel with said fifth relay contact; and
   a fourth relay coil in series with said second control circuit for controlling said sixth relay contact.

6. The apparatus of claim 5 wherein said first and second holding circuit means are in parallel with each other and in series with said detecting means.

* * * * *